Feb. 25, 1941.   D. L. BEEMAN   2,233,362
SYSTEM OF ELECTRIC DISTRIBUTION
Filed June 29, 1940
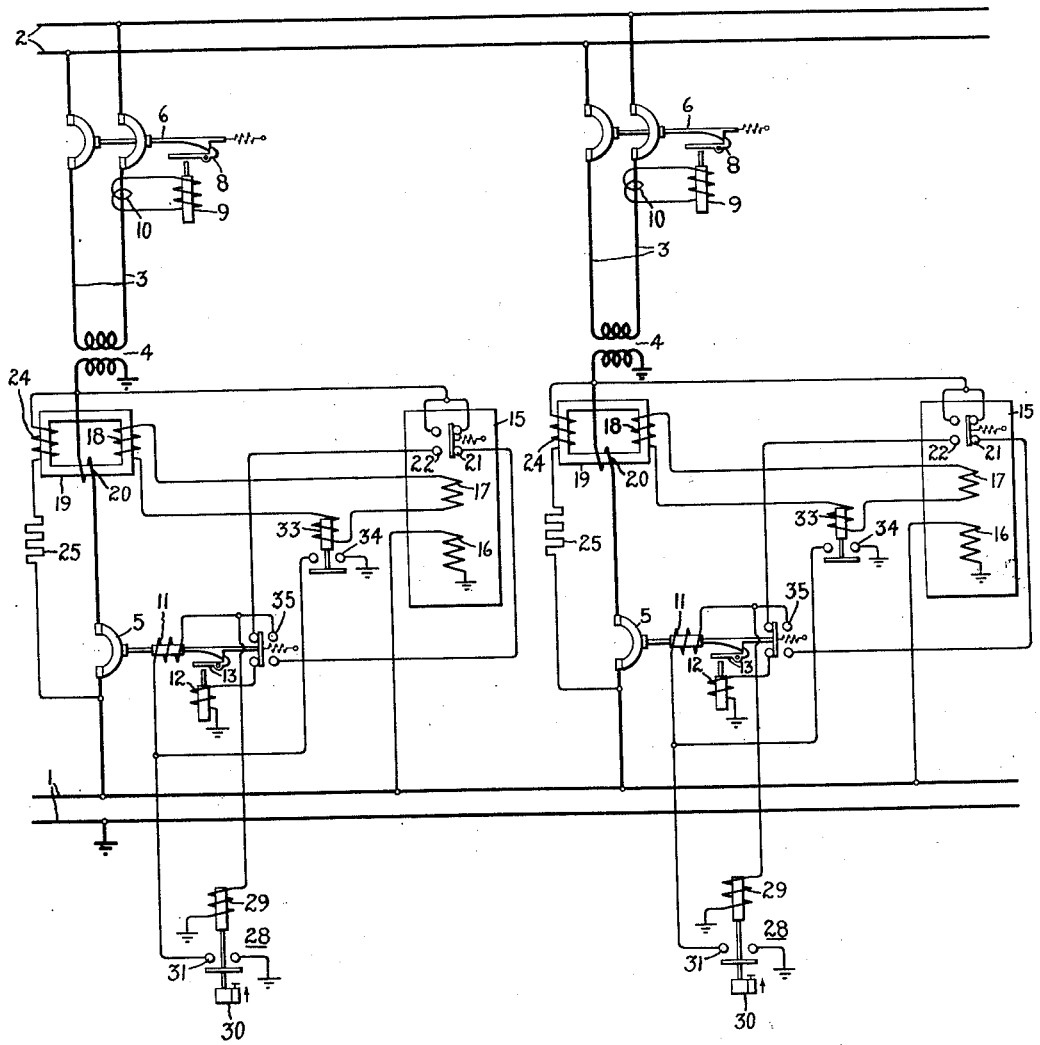
Inventor:
Donald L. Beeman,
by Harry E. Dunham
His Attorney.

Patented Feb. 25, 1941

2,233,362

UNITED STATES PATENT OFFICE 2,233,362

SYSTEM OF ELECTRIC DISTRIBUTION

Donald L. Beeman, Scotia, N. Y., assignor to General Electric Company, a corporation of New York Application June 29, 1940, Serial No. 343,241

8 Claims. (Cl. 171—97)

My invention relates to systems of electric distribution and particularly to such systems in which an alternating current network is supplied with current at a plurality of points by means of feeder circuits each which includes one or more step-down power transformers and an associated network protector comprising a network circuit breaker and control apparatus therefor interposed between the transformer and the network. In such systems it has been the practice to design the control apparatus so that it effects the closing of the network circuit breaker when the power transformer secondary voltage is higher than the network voltage and a predetermined phase range exists between the two voltages and so that it effects the opening of the network circuit breaker when the flow of power is from the network to the associated transformer.

In such systems of electric distribution, conditions sometimes occur which cause the network voltage to be high enough to effect the opening of some of the network breakers while others remain closed. While such breakers are open, a sufficient load, such for example as a starting motor, may be momentarily connected to the network at a point near enough to an open breaker to lower the network voltage sufficiently at that point to effect the closing of the adjacent network breakers. However, as soon as the motor has completed its starting operation, the motor load may be reduced to such a small value that the network voltage is again restored to a value sufficient to effect the opening of the circuit breakers which were just closed.

One object of my invention is to provide an arrangement which will prevent the unnecessary closing of a network circuit breaker under such temporary load conditions.

In accordance with my invention, I provide an arrangement in which the closing of a circuit breaker between two circuits is delayed for a predetermined time when the voltage difference between the two circuits is below a predetermined value but is effected immediately when the voltage difference is above a predetermined value.

My invention will be better understood from the following description when taken in connection with the accompanying drawing the single figure of which diagrammatically illustrates an alternating current system of distribution embodying my invention, and the scope of my invention will be pointed out in the appended claims.

Referring to the drawing, 1 is an alternating current network which is arranged to be supplied with power from a suitable supply circuit 2 by means of a plurality of feeder circuits 3, two of which are shown in the drawing. In order to simplify the disclosure, single phase circuits are shown, but it will be obvious to those skilled in the art that my invention is applicable also to circuits of any number of phases.

Each feeder circuit 3 includes a step-down power transformer 4, the low voltage secondary winding of which is arranged to be connected to the network by means of a suitable circuit breaker 5 and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or sub-station containing the supply circuit 2.

The circuit breakers 6 may be of any suitable type, examples of which are well known in the art, and are preferably arranged so that they are opened automatically in response to overload conditions on the respective feeder circuits. As shown, each circuit breaker 6 is an overload circuit breaker of the well known latched closed type and is adapted to be opened by releasing a latch 8 either manually or automatically by means of an overload relay 9 which is connected in series relation with the respective feeder circuit 3 by means of a current transformer 10. Any suitable means, either manually or automatically controlled, may be provided for closing each circuit breaker 6.

The circuit breakers 5 may also be of any suitable type. As shown in the drawing, each of these circuit breakers is of the well known latched closed type and includes a closing coil 11 which, when energized, closes the circuit breaker and a trip coil 12 which, when energized, releases a latch 13 that is arranged to hold the circuit breaker in its closed position.

In order to effect the opening of a secondary circuit breaker 5 when a fault occurs in the associated transformer 4 or feeder circuit 3, and the associated primary circuit breaker 6 is opened, each secondary circuit breaker 5 has associated therewith a power directional relay 15 of the wattmetric type which is arranged to effect the energization of the trip coil 12 of the circuit breaker when the amount of power flowing from the network to the associated feeder circuit exceeds a predetermined small amount. As shown, each power directional relay 15 includes a potential winding 16 which is permanently connected across the network 1 and a current winding 17 which is permanently connected across the secondary winding 18 of current transformer 19, the primary winding 20 of which is connected in series relation with the secondary winding of the associated power transformer 4 and the network 1, when the associated circuit breaker 5 is closed. Each power directional relay 15 is arranged so that normally it maintains closed its contacts 21 which are in the energizing circuit for the closing coil 11 of the associated circuit breaker 5. When, however, more than a predetermined amount of reverse power flows from the network 1 to a feeder circuit 3, the associated power directional relay 15 is arranged to open its contacts 21 and close its contacts 22 which are in the energizing circuit for the trip coil 12 of the associated circuit breaker 5.

In order that each power directional relay 15 may also control the reclosing of the associated circuit breaker 5 in response to the relative phases and magnitudes of the respective power transformer secondary and network voltages, each current transformer 19 is provided with a tertiary winding 24 which is connected in any suitable manner so that it is energized in accordance with the difference between the respective power transformer secondary voltage and the network voltage when the circuit breaker 5 is opened. As shown in the drawing, each winding 24 is connected in a shunt circuit around the terminals of the respective circuit breaker 5. Preferably a suitable current limiting device, such as the resistor 25, is connected in series with each transformer winding 24. With such an arrangement it will be seen that each winding 24, when its respective circuit breaker 5 is open, causes a current to flow through the current winding 17 of the respective power directional relay 15 which varies in accordance with the relative phases and magnitudes of the respective power transformer secondary and network voltages. This current through the winding 17 is in a proper direction to effect the closing of the contacts 21 only when the secondary voltage of the associated power transformer 4 exceeds the network voltage and a predetermined phase relation exists between these voltages.

In accordance with my invention, contacts 21 of the power directional relay 15, in addition to controlling directly the energizing circuit of the closing coil 11 of the associated circuit breaker 5, also control the energization of an operating winding of an associated timing device 28 which in turn controls contacts in the energizing circuit of the closing coil 11 so that the contacts 21 of the power directional relay 15 have to remain closed for a predetermined time before they can effect the closing of the associated circuit breaker 5. The timing device 28 may be a thermal responsive device or a motor-operated timer or a timing device of any other suitable construction. Preferably the timing device is arranged so that it resets itself substantially instantaneously when its operating winding is deenergized. For simplicity, the timing device 28 is shown as an electromagnetic relay having an operating coil 29, a dash-pot 30 for retarding the operation of the relay only when the winding 29 is energized, and contacts 31 which are arranged to be closed after the winding 29 has been energized for a predetermined time.

In order that a circuit breaker 5 may be closed immediately in case the associated feeder circuit 3 is energized and the network 1 is deenergized or the voltage thereof is abnormally low, each circuit breaker 5 has associated therewith a current relay 33 which is connected in series with the current winding 17 of the power directional relay 15 and which is arranged to close its contacts 34 and effect the energization of the closing coil 11 independently of the operation of the associated time relay 28 when the voltage difference between the secondary of the associated power transformer 4 and the network is above a predetermined value. Preferably each relay 33 is set so that it closes its respective contacts 34 only in response to a relatively large difference between the voltages of the associated power transformer 4 and the network 1.

The operation of the arrangement shown in the drawing is as follows:

Let it be assumed that the circuit breakers 5 and 6 in one of the feeder circuits 3 are closed and that the circuit breakers 5 and 6 in the other feeder circuit are open. Under these conditions, the voltage windings 16 of both power directional relays 15 are energized in response to the network voltage, and the current winding 17 of the relay 15 associated with the closed circuit breaker 5 is energized in response to the current being supplied to the network 1 through the closed circuit breaker 5. Therefore, this relay 15 maintains its contacts 21 closed and its contacts 22 opened. Since the winding 24 and the resistor 25 associated with the closed circuit breaker 5 are short-circuited, substantially all of the current that flows through the closed circuit breaker 5 flows through the primary winding 20 of the associated current transformer 19.

The power directional relay 15 associated with the open circuit breaker 5, however, maintains its contacts 21 open and its contacts 22 closed since the circuit of the winding 20 of the associated current transformer 19 is open and the winding 24 thereof is energized by the small reverse current flowing therethrough to the secondary winding of the deenergized power transformer 4.

Let it now be assumed that the open circuit breaker 6 is closed so that the transformer 4, which is connected thereto, becomes energized from the supply circuit 2. If the secondary voltage of this transformer 4 exceeds the network voltage and a predetermined phase relation exists between this secondary voltage and the network voltage, the current in the winding 24 of the current transformer 19 associated with the open circuit breaker 5 induces in the secondary winding 18 of this current transformer a voltage of the proper phase to cause the power directional relay 15 associated therewith to close its contacts 21. The closing of these contacts completes across the secondary winding of the power transformer 4 and through the auxiliary contacts 35 on the open circuit breaker 5 an energizing circuit for the operating winding 29 of the time relay 28. If the voltage difference across the open circuit breaker 5 is below a predetermined value, sufficient current does not flow through the operating winding of the current relay 33 under these conditions to cause this relay to close its contacts 34. Therefore, the energizing circuit of the closing coil 11 of the open circuit breaker 5 is not completed until after the contacts 21 of the power directional relay 15 have remained closed long enough to allow the time relay 28 to complete its timing operation and close its contacts 31. When the contacts 31 of the time relay 28 close, an energizing circuit is completed for the closing coil 11 across the secondary winding of the power transformer 4 to effect the closing of the open circuit breaker 5. When this circuit breaker 5 closes in response to the energization of the associated closing coil 11, the opening of the auxiliary contacts 35 of the circuit breaker deenergizes the closing coil 11 and the time relay 28, but the circuit breaker does not open because it is held in its closed position by the latch 13 after the closing coil 11 is deenergized.

If the difference between the voltages of the secondary winding of the power transformer 4 and the voltage of the network 1, which causes the power directional relay 15 to close its contacts 21, also exceeds a predetermined value so that sufficient current flows through the current relay 33 associated with an open circuit breaker 5 to cause the relay to close its contacts 34, an energizing circuit is immediately completed for the closing coil 11 independently of the time relay 28 so that it is not necessary to wait for the time relay 28 to complete its timing operation before the open circuit breaker is closed.

After a circuit breaker 5 has been closed, it remains closed until reverse power flows from the network 1 to the associated power transformer 4 and causes the associated power directional delay 15 to open its contacts 21 and close its contacts 22 thereby connecting the associated trip coil 22 across the secondary winding of the power transformer 4 to effect the opening of the associated circuit breaker 5 to disconnect the associated power transformer 4 from the network 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a system of electric distribution, two alternating current circuits, switching means for interconnecting said circuits, timing means for effecting the operation of said switching means, means responsive to a predetermined voltage condition of said circuits for effecting the operation of said timing means, and means responsive to another predetermined voltage condition of said circuits for effecting the operation of said switching means independently of said timing means.

2. In a system of electric distribution, two alternating current circuits, switching means for interconnecting said circuits, timing means for effecting the operation of said switching means, means responsive to a predetermined phase and magnitude relation between the voltages of said circuit for effecting the operation of said timing means, and means responsive to a predetermined voltage condition of said circuits for effecting the operation of said switching means independently of said timing means.

3. In a system of electric distribution, two alternating current circuits, switching means for interconnecting said circuits, timing means for effecting the operation of said switching means, means responsive to a predetermined phase and magnitude relation between the voltages of said circuit for effecting the operation of said timing means, and means responsive to a predetermined voltage difference of said circuits for effecting the operation of said switching means independently of said timing means.

4. In combination, an alternating current supply circuit, an alternating current load circuit, a circuit breaker between said circuits, a current transformer having a winding energized in response to the current through said circuit breaker and a secondary winding, a tertiary winding on said current transformer connected in series relation with said circuits when said circuit breaker is open, timing means for effecting a predetermined operation of said circuit breaker, a wattmetric relay for controlling the operation of said timing means having a winding connected in circuit with said secondary winding and a winding responsive to the voltage of one of said circuits, and means responsive to a predetermined amount of current in said secondary winding of said transformer for effecting said predetermined operation of said circuit breaker independently of said timing means.

5. In combination, an alternating current supply circuit, an alternating current load circuit, a circuit breaker between said circuits, a current transformer having a winding energized in response to the current through said circuit breaker and a secondary winding, a tertiary winding on said current transformer connected in series relation with said circuits when said circuit breaker is open, timing means for effecting the closing of said circuit breaker, a wattmetric relay for effecting the opening of said circuit breaker and for effecting the operation of said timing means including a winding connected in circuit with said secondary winding and a winding responsive to the voltage of one of said circuits, and means responsive to a current in said secondary winding in excess of a predetermined value for effecting the closing of said circuit breaker independently of said timing means.

6. In combination, an alternating current supply circuit, an alternating current network, a power transformer having its primary winding connected to said supply circuit and its secondary winding connected to said network, a circuit breaker between said transformer secondary winding and said network, timing means for effecting the closing of said circuit breaker, means responsive to a predetermined phase and magnitude relation between the transformer secondary voltage and the network voltage for effecting the operation of said timing means, and means responsive to a predetermined difference between the transformer secondary voltage and the network voltage for effecting the closing of said circuit breaker independently of said timing means.

7. In combination, an alternating current supply circuit, an alternating current network, a power transformer having its primary winding connected to said supply circuit and its secondary winding connected to said network, a circuit breaker between said transformer secondary winding and said network, a current transformer having a winding energized in response to the current through said circuit breaker and a secondary winding, a tertiary winding on said current transformer energized in response to the relative phases and magnitudes of said power transformer secondary and said network voltages when said circuit breaker is open, timing means for effecting a predetermined operation of said circuit breaker, a wattmetric relay for effecting another predetermined operation of said circuit breaker and for effecting the operation of said timing means including a winding connected in circuit with said secondary winding of said current transformer and a winding responsive to the voltage of one of said circuits, and means responsive to a predetermined amount of current in said secondary winding of said current transformer for effecting said first-mentioned predetermined operation of said circuit breaker independently of said timing means.

8. In combination, an alternating current supply circuit, an alternating current network, a power transformer having its primary winding connected to said supply circuit and its secondary winding connected to said network, a circuit breaker between said transformer secondary winding and said network, a current transformer having a winding energized in response to the current through said circuit breaker and a secondary winding, a tertiary winding on said current transformer energized in response to the relative phases and magnitudes of said power transformer secondary and said network voltages when said circuit breaker is open, timing means for effecting the closing of said circuit breaker, a wattmetric relay for effecting the opening of said circuit breaker and for effecting the operation of said timing means including a winding connected in circuit with said secondary winding of said current transformer and a winding responsive to the voltage of said network, and means responsive to a predetermined amount of current in said secondary winding of said current transformer for effecting the closing of said circuit breaker independently of said timing means.

DONALD L. BEEMAN.